Sept. 12, 1939.    S. B. NEILEY    2,172,400

MANUFACTURE OF ARTICLES FROM AQUEOUS RUBBER DISPERSIONS

Filed Oct. 21, 1937

Fig. 1

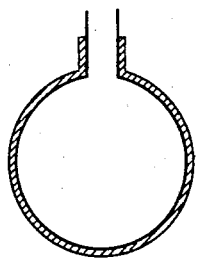

Step 1

Liquid dispersion on former contains a potential coagulant and a stabilizing amine

Fig. 2

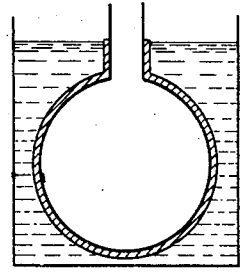

Step 2

Tank contains solution which reacts with amine

Fig. 3

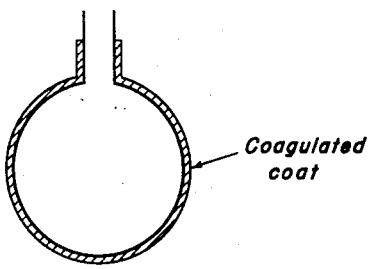

Step 3

Fig. 4

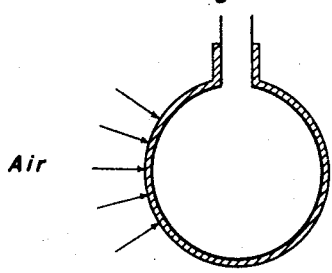

Step 1A
Liquid dispersion on former contains a potential coagulant and a volatile amine

Fig. 5

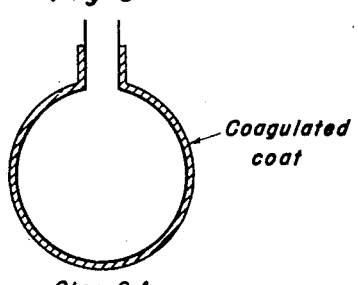

Step 2A

Inventor:
By  STEPHEN B. NEILEY
Theodore C. Browne,
Attorney.

Patented Sept. 12, 1939

2,172,400

UNITED STATES PATENT OFFICE 2,172,400

MANUFACTURE OF ARTICLES FROM AQUEOUS RUBBER DISPERSIONS

Stephen B. Neiley, Winchester, Mass., assignor to Dewey and Almy Chemical Company, North Cambridge, Mass., a corporation of Massachusetts Application October 21, 1937, Serial No. 170,223

8 Claims. (Cl. 18—58)

This is a continuation in part of my application for patent application, Serial No. 33,076, filed July 25, 1935, and is directed to the manufacture of formed shapes from aqueous dispersions of rubber.

It is an object of the present invention to cause the rapid coagulation of latex in molding, dipping or extrusion procedures; to form on the surface of the mold one or a number of coagulated layers of latex which may later be dried and vulcanized; to form layers of material thickness; and to do this in a rapid and inexpensive manner. These and other objects will become apparent from the specification.

In the application to which I have referred, I disclosed that certain substances potentially capable of causing the coagulation of rubber dispersions may have their coagulative action inhibited by the presence in the compound of an amine. Upon the withdrawal or the exhaustion of the excess of amine, the potential coagulant becomes active and the dispersion forthwith coagulates. In the present instance, I make use of this discovery to produce formed shapes from aqueous dispersions in the manner following, and, although I shall recite, as a specific and preferred example, the manufacture of formed shapes by the dipping of forms in aqueous dispersions, it is obvious that my invention may be applied as well to the use of hollow forms and to the common procedures of casting latex.

In carrying out my invention, I include in an aqueous dispersion of rubber a potential coagulant for the dispersion. The potential coagulant is a "double" or complex salt formed by the reaction of water-soluble amine compounds upon salts of multivalent metals. Many such complex salts are known. For reasons of ready availability and cost, I prefer to use that disclosed in my Reissue Patent No. 19,426 which is the double salt of zinc and ammonia.

The accompanying drawing is a flow sheet illustrating the various steps involved in my process. Fig. 1 indicates step 1 in my process. A former which may be of any shape is coated with a dispersion containing a potential coagulant and a stabilizing amine. Fig. 2 (step 2) illustrates the step of dipping the coated former in a solution capable of reacting with the amine in the coating. Fig. 3 (step 3) illustrates the coagulated coat which is formed from the liquid dispersion as a result of the reaction taking place in step 2.

An alternative procedure is illustrated in Figs. 4 and 5. Fig. 4 (step 1a) illustrates a former coated with a liquid dispersion containing a volatile amine subjected to a current of air. Fig. 5 (step 2a) illustrates the coagulated coat which is formed when the air current removes the stabilizing excess of amine from the dispersion.

Specifically, in carrying out my invention, I dissolve 10 pounds of granulated zinc chloride in 160 parts of water and to this solution I add 15 parts of 28° Baumé commercial aqueous ammonia. This solution is added to commercial concentrated latex containing 60–65% rubber solids, sulphur, activator, and accelerator in appropriate amounts. Approximate proportions are: Dispersion 1000 parts, potential coagulant 11 parts.

A dipping form, for example a glove form, of any conventional material, is now dipped in the dispersion and the form slowly withdrawn with an adherent coat of the dispersion thereon. The coated form is then dipped in a solution capable of reacting with the excess ammonia present. This, for example, may be a 10% solution of formaldehyde. When the excess ammonia has been exhausted, the zinc-ammonium chloride breaks down; coagulative zinc ions are immediately released and the coating of rubber upon the form at once unites into a strong, coherent, coagulated mass.

If necessary, in order to obtain thick gauge goods, the form with its coagulated coating may again be dipped into the dispersion and again be dipped into the exhausting solution as before described. This process may continue until a deposit of sufficient depth has been built up.

Alternatively, it is not necessary to exhaust the stabilizing excess of ammonia by chemical means. It may be removed by evaporation by withdrawing the coated forms into a chamber through which passes a current of air which is, preferably, but not necessarily, warmed and dried.

In the example given, namely, when the concentration of potential coagulant to concentrated latex is 11 parts to 1000 parts, the film coagulates upon the form in warmed air in 10–15 seconds. To produce thicker coats the process may be repeated as above described.

In making extruded products, such as thread, the dispersion is streamed through a nozzle into the reactive solution.

Although, as I have stated, I prefer to use the double salts of zinc and ammonia, double salts of many metals which form with a wide range of water-soluble amines are also useful. For example, the double salts of magnesium, nickel, copper, cobalt, mercury and molybdenum, as well as zinc which are formed with the primary, secondary and tertiary methyl and ethyl amines; double salts of hydroxy alkyl amines, such as mono, di, and triethanolamine; salts formed with ethanol-morpholine, pyridine, ethylene diamine and diethylene-triamine, release upon their decomposition metallic ions which coagulate the latex coat.

I prefer to remove the excess ammonia by dipping the form in a water solution of formaldehyde, but fatty acids are preferable when higher amine compounds are used. In the latter case, oleic, stearic, rincinoleic, lauric, etc., acids, very satisfactorily break down the amine-complex salt and bring about the coagulation of the latex. They are preferably used in the form of water dispersions.

Since commercial latices are usually preserved with ammonia, it is probable that, when double salts of amines of higher molecular weight are added to such dispersions, the ammonia replaces a part of the amine in the complex.

The stabilizing excess probably then consists in part of the ammonia and in part of the freed amine. In any event, I have found it preferable to immerse coatings of dispersions containing complexes of amines of higher molecular weight in water emulsions containing both formaldehyde and a fatty acid.

When the evaporative method, however, is used for the removal of the amine, only such amines as are volatile or fugitive at approximate atmospheric temperatures may be used.

My invention is not limited to natural latex, but is useful in connection with all water dispersions of natural or artificial rubber-like substances which coagulate in the presence of multivalent cations. I intend, therefore, that the term "water dispersion of rubber" shall be understood to include all such substances.

Because of the lack of a recognized inclusive term, I have not used the word amine in its strict chemical sense as an alkyl substitution product of ammonia, but broadly. In the appended claims, I intend that the word amine shall include not only substitution products of ammonia, but ammonia itself.

What I claim is:

1. The process of making formed shapes from water dispersions of rubber which comprises including in the dispersion a potential coagulant and a stabilizing excess of a water-soluble amine, coating a form with the dispersion and immersing the coated form in a solution capable of reacting with the amine, thereby causing the potential coagulant to become active and to coagulate the coating.

2. The process of making formed shapes from water dispersions of rubber which comprises including in the dispersion a potential soagulant and a stabilizing excess of a water-soluble amine, coating a form with the dispersion and thereafter removing the amine by evaporation, thereby causing the potential coagulant to become active and to coagulate the coating.

3. The process of making formed shapes from water dispersions of rubber which comprises including in the dispersion a double salt of ammonia and a multivalent metal, and a stabilizing excess of ammonia, coating a form with the dispersion and immersing the coated form in a solution of formaldehyde, thereby causing the potential coagulant to become active and to coagulate the coating.

4. The process of making extruded shapes from water dispersions of rubber which comprises including in the dispersion a potential coagulant and a stabilizing excess of a water-soluble amine, streaming the dispersion into a solution capable of reacting with the amine, thereby causing the potential coagulant to become active and to coagulate the extruded mass.

5. The process of making formed shapes from water dispersions of rubber which comprises including in the dispersion a potential coagulant and a stabilizing excess of a water-soluble amine, coating a form with the dispersion and immersing the coated form in a solution containing a fatty acid, thereby causing the potential coagulant to become active and to coagulate the coating.

6. The process of making formed shapes from water dispersions of rubber which comprises including in the dispersion a potential coagulant and a stabilizing excess of a water-soluble amine, coating a form with the dispersion and immersing the coated form in a water dispersion of a fatty acid, thereby causing the potential coagulant to become active and to coagulate the coating.

7. The process of making formed shapes from water dispersions of rubber which comprises including in the dispersion a potential coagulant and a stabilizing excess of a water-soluble amine, coating a form with the dispersion and immersing the coated form in a water dispersion containing formaldehyde and a fatty acid, thereby causing the potential coagulant to become active and to coagulate the coating.

8. The process of making formed shapes from water dispersions of rubber which comprises including in the dispersion a potential coagulant and a stabilizing excess of a water soluble amine, coating a form with the dispersion and thereafter exhausting the excess of amine from the coating, thereby causing the potential coagulant to become active and to coagulate the coating.

STEPHEN B. NEILEY.